(12) United States Patent
Lucero

(10) Patent No.: US 12,364,311 B2
(45) Date of Patent: Jul. 22, 2025

(54) INSULATIVE MATERIAL

(71) Applicant: Defy, LLC, Corona, CA (US)

(72) Inventor: Michael Lucero, Corona, CA (US)

(73) Assignees: Michael Lucero, Corona, CA (US); Diana Maria Rios-Lucero, Corona, CA (US)

( * ) Notice: Subject to any disclaimer, the term of this patent is extended or adjusted under 35 U.S.C. 154(b) by 487 days.

(21) Appl. No.: 17/272,606

(22) PCT Filed: Aug. 28, 2019

(86) PCT No.: PCT/US2019/048523
§ 371 (c)(1),
(2) Date: Mar. 1, 2021

(87) PCT Pub. No.: WO2020/047066
PCT Pub. Date: Mar. 5, 2020

(65) Prior Publication Data
US 2021/0368911 A1    Dec. 2, 2021

Related U.S. Application Data

(60) Provisional application No. 62/724,448, filed on Aug. 29, 2018.

(51) Int. Cl.
*A43B 13/04* (2006.01)
*A43B 13/12* (2006.01)
(Continued)

(52) U.S. Cl.
CPC ............ *A43B 13/04* (2013.01); *A43B 13/125* (2013.01); *A43B 13/189* (2013.01); *A43B 13/40* (2013.01); *B29C 65/70* (2013.01); *B29C 70/68* (2013.01); *B32B 3/12* (2013.01); *B32B 25/04* (2013.01); *B32B 37/12* (2013.01); *B32B 2266/057* (2016.11); *B32B 2266/126* (2016.11); *B32B 2305/024* (2013.01); *B32B 2437/02* (2013.01)

(58) Field of Classification Search
None
See application file for complete search history.

(56) References Cited

U.S. PATENT DOCUMENTS

| 5,915,819 A | * | 6/1999 | Gooding | ................ A43B 19/00 36/71 |
| 2009/0227163 A1 | * | 9/2009 | Perry | ...................... B32B 27/10 442/65 |
| 2016/0107411 A1 | * | 4/2016 | Fox | ...................... A43B 13/187 428/161 |

FOREIGN PATENT DOCUMENTS

KR          101366100 B1 *  2/2014

OTHER PUBLICATIONS

Bae, Shoes Outsole with Aerogel, Feb. 24, 2014, machine translation of KR101366100 (Year: 2014).*

* cited by examiner

*Primary Examiner* — Chinessa T. Golden
(74) *Attorney, Agent, or Firm* — Crowell & Moring LLP; John C. Freeman

(57) ABSTRACT

A material is disclosed herein that may include a plurality of chambers. A wall, a bottom surface, and a top surface may define a chamber. The wall may have a top portion and a bottom portion where the top portion may be adjacent to the top surface, and the bottom portion may be adjacent to the bottom surface. The wall may include an elastic material, and an aerogel powder or an aerogel foam may be disposed within the chamber. This material can be incorporated into clothing and shoes, for example.

14 Claims, 4 Drawing Sheets

(51) Int. Cl.
  *A43B 13/18* (2006.01)
  *A43B 13/40* (2006.01)
  *B29C 65/70* (2006.01)
  *B29C 70/68* (2006.01)
  *B32B 3/12* (2006.01)
  *B32B 25/04* (2006.01)
  *B32B 37/12* (2006.01)

INSULATIVE MATERIAL

This application is a National Stage application of International Application No. PCT/US2019/048523, filed Aug. 28, 2019, wherein the above-mentioned International Application claims the benefit under 35 U.S.C. § 119 (a) of the filing date of Aug. 29, 2018 of U.S. Provisional Application No. 62/724,448, the entire contents of each of which are incorporated herein by reference.

BACKGROUND

1. Field of the Invention

The present disclosure generally relates to an insulative material. More particularly, the disclosure pertains to a material having a plurality of compartments that may contain an aerogel powder or an aerogel foam.

2. Description of the Related Art

Clothing and footwear changed dramatically in the $20^{th}$ century as new materials emerged and new uses for and advantages of the materials were discovered. New materials and uses continue to be created and discovered to solve problems. For example, extreme environments require that an individual in such an environment to be clothed in such a way to protect from the heat, cold, radiation, or contamination that may be present.

Footwear comes into direct contact with the environment and should be designed to protect the wearer and provide adequate support. Some environments require footwear that can be comfortable and supportive for a wearer who may be on their feet the entire day.

A problem associated with footwear is that the wearer can often experience uncomfortable temperatures if the footwear is worn on hot or cold surfaces. Conventional footwear may have an insole and outsole made of a solid polymer material that can offer some protective effect; however, there remains a need for new materials and designs. It is well known in the art that an insole is positioned within the interior of the shoe into which a foot of an individual is inserted. It is well known that the insole is positioned above the outsole of the shoe and has a top surface upon which the bottom of the foot or a socked foot is supported. Accordingly, the insole is positioned between the outsole and the the foot or socked foot.

BRIEF SUMMARY

A material is disclosed herein that may include a plurality of chambers. A wall, a bottom surface, and a top surface may define a chamber of the plurality of chambers. The wall may have a top portion and a bottom portion where the top portion may be adjacent to the top surface, and the bottom portion may be adjacent to the bottom surface. The wall may include an elastic material, and an aerogel powder or an aerogel foam may be disposed within the chamber.

In some embodiments, a horizontal cross-section of the chamber may be a shape having at least three sides.

In some embodiments, the shape may have six sides forming a hexagon.

In some embodiments, the bottom surface may be integrally attached to the bottom portion of the wall.

In some embodiments, the top surface may be adhered to the top portion of the wall.

In some embodiments, the aerogel powder may be a silicon aerogel powder.

In some embodiments, each chamber has an amount of aerogel powder or aerogel foam ranging from about 0.01 ml to about 0.1 ml.

In some embodiments, the elastic material may be selected from synthetic rubber, natural rubber, neoprene rubber, thermoplastic elastomer, and foam.

In some embodiments, the elastic material may be an elastomer having a Shore A hardness of about 0 to about 50 or a Shore 00 hardness of about 30 to about 85.

In some embodiments, the aerogel powder or aerogel foam is not incorporated into the elastic material.

In some embodiments, an article of clothing, a shoe, or an insole is disclosed that may include a material that has a plurality of chambers. A wall, a bottom surface, and a top surface may define a chamber of the plurality of chambers. The wall may have a top portion and a bottom portion where the top portion may be adjacent to the top surface, and the bottom portion may be adjacent to the bottom surface. The wall may include an elastic material, and an aerogel powder or an aerogel foam may be disposed within the chamber.

In some embodiments, a process of making a material is provided. The process may include adding an elastic material precursor into a mold; curing the elastic material precursor to form a plurality of chambers comprising an elastic material; adding an aerogel powder or an aerogel foam into the chamber; attaching a bottom surface to the bottom portion of the wall by either integrally forming the bottom surface and the wall or attaching the bottom surface after the wall is formed; and attaching a top surface to the top portion of the wall. A wall, the wall having a top portion and a bottom portion, may define a chamber of the plurality of chambers.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

A material is disclosed herein that may include a plurality of chambers. A wall, a bottom surface, and a top surface may define a chamber of the plurality of chambers. The wall may have a top portion and a bottom portion where the top portion may be adjacent to the top surface, and the bottom portion may be adjacent to the bottom surface. The wall may include an elastic material, and an aerogel powder or an aerogel foam may be disposed within the chamber.

In some embodiments, a process of making a material is provided. The process may include adding an elastic material precursor into a mold; curing the elastic material precursor to form a plurality of chambers; adding an aerogel powder or aerogel foam into the chamber; attaching a bottom surface to the bottom portion of the wall by either integrally forming the bottom surface and the wall or attaching the bottom surface after the wall is formed; and attaching a top surface to the top portion of the wall. The wall may have a top portion and a bottom portion. The elastic material precursor may be a liquid silicone rubber.

Figure 1A:
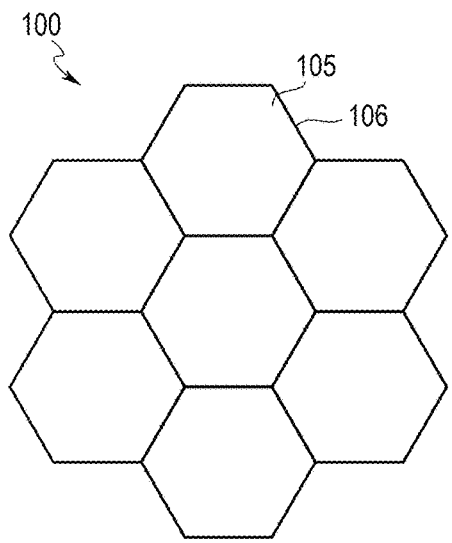
FIGS. 1A-1E show horizontal cross-sections of compartments with different shapes.
Figure 1B:
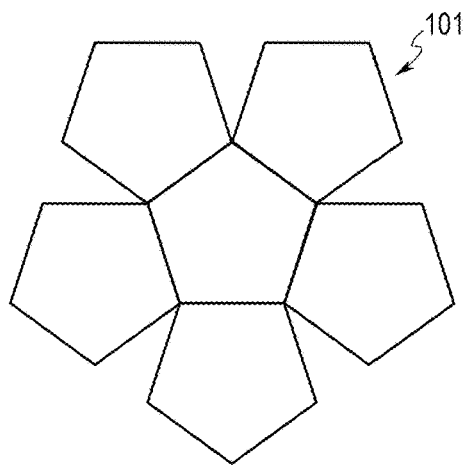
Figure 1C:
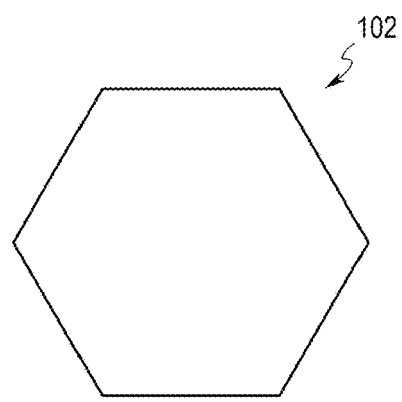
Figure 1D:
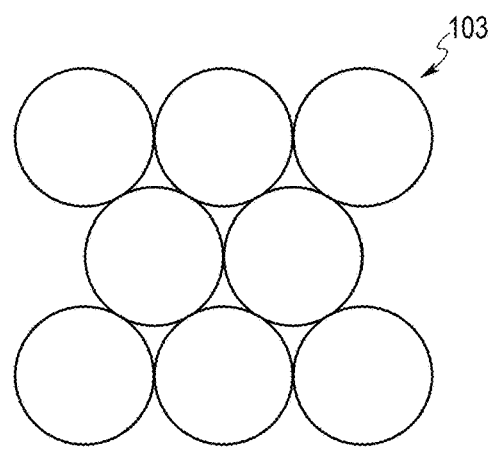
Figure 1E:
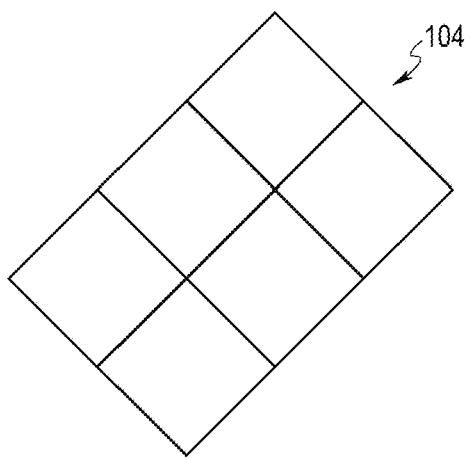

Referring to FIG. 1A, a horizontal cross-section of the plurality of chambers 100 shows that each compartment 105 has a hexagonal shape defined by the walls 106 of the compartment. FIGS. 1B-1E show cross-sections of compartments have different shapes such as pentagons 101, triangles 102, circles 103, or squares 104. The depicted shapes do not comprise a comprehensive group of the possible shapes that are compatible with the subject matter disclosed herein. The compartments can be designed to have a horizontal cross-section other than those depicted in the figures. FIG. 1A shows that compartment 105 can be adjacent to and share a wall with another compartment thereby forming a honeycomb structure.

In some embodiments, a horizontal cross-section of the chamber may be a shape having at least three sides. In some embodiments, the shape may have six sides forming a hexagon.

Figure 2:
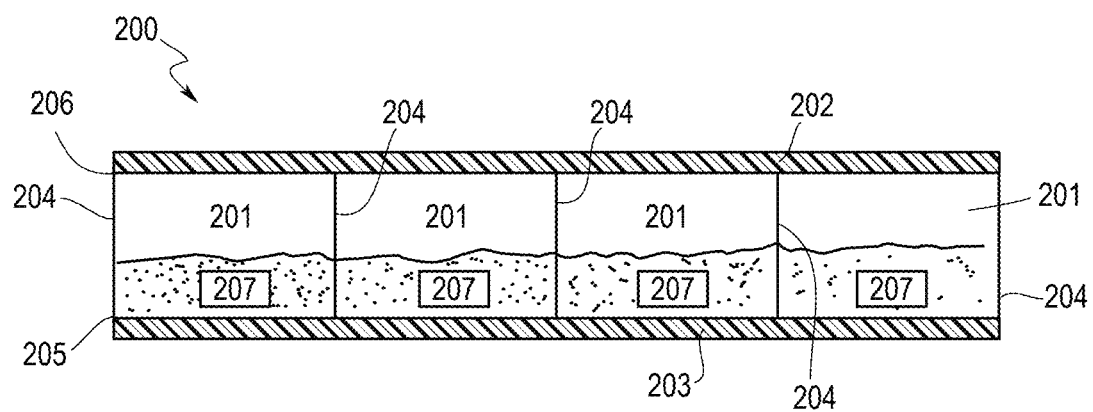
FIG. 2 shows a vertical cross-section of the material.

Referring to FIG. 2, a vertical cross-section of the material is depicted. The material 200 may include a plurality of chambers. A wall 204, a bottom surface 203, and a top surface 202 may define a chamber 201 of the plurality of chambers. The wall 204 may have a top portion 206 and a bottom portion 205 where the top portion 206 may be adjacent to the top surface 202, and the bottom portion 205 may be adjacent to the bottom surface 203. The wall 204 may include an elastic material, and an aerogel powder or an aerogel foam 207 may be disposed within the chamber.

In some embodiments, the bottom surface may be integrally attached to the bottom portion of the wall. In this configuration, the bottom surface and the wall may be made of the same elastic material. An integrally attached bottom surface is not required but it may be more economical to form the bottom surface and walls in a single step.

In some embodiments, the top surface may be adhered to the top portion of the wall. Any suitable glue or other means may be used to attach the top surface to the top portion of the wall. For example, a silicone adhesive such as Sil-poxy or Permabond 2050 can be used.

At least one compartment of the material may contain an aerogel powder, an aerogel foam, or any combination thereof. The bottom surface, wall, and top surface enclose the aerogel powder or aerogel foam in a compartment. In some embodiments, every compartment of the material contains aerogel powder or foam. In some embodiments, a compartment only contains the aerogel powder or foam and does not contain any other additive.

The aerogel powder may be a silicon aerogel powder. A silicon aerogel powder is a silicon oxide ($SiO_2$) consisting of a porous nanostructured material. The bulk density of the aerogel powder may be about 0.01 to about 0.3 $g/cm^3$. In some embodiments the bulk density may be about 0.03 to about 0.1 $g/cm^3$. The porosity of the aerogel powder may be greater than about 90%. The surface area of the aerogel powder may about 600 to about 800 $m/g^2$.

The aerogel foam may have a density of from about 105 $kg/m^3$ to about 130 $kg/m^3$. In some embodiments, the density is about 120 $kg/m^3$. The thermal conductivity of the aerogel foam may range from about 20 mW $m^{-1}$ $K^{-1}$ to about 30 mW $m^{-1}$ $K^{-1}$. In some embodiments, the thermal conductivity of the aerogel foam is about 27 mW $m^{-1}$ $K^{-1}$. The aerogel foam may have a coefficient of thermal expansion ($10^{-5}$ $K^{-1}$) of about 7. The compressive strength (kPA) and the compressive modulus (kPa) of the aerogel foam may be about 29 and about 394, respectively. In some embodiments, the aerogel foam may have a compressive strength ranging from about 25 to about 50. In some embodiments, the aerogel foam may have a compressive modulus ranging from 350 to about 1000. The foam may also be hydrophobic and oleophilic.

In some embodiments, the aerogel powder or aerogel foam is not incorporated into the elastic material.

A chamber may have an amount of aerogel powder or aerogel foam ranging from about 0.01 ml to about 0.1 ml. The amount of aerogel powder in the chamber may be about 0.02 ml, about 0.03 ml, about 0.04 ml, about 0.05 ml, about 0.06 ml, about 0.07 ml, about 0.08 ml, or about 0.09 ml.

The wall of the material may be made of an elastic material. The elastic material may be any suitable material such as, for example, synthetic rubber, natural rubber, neoprene rubber, thermoplastic elastomer, or foam. In some embodiments, the elastic polymer is an elastomer such as, for example, a polymer made from liquid silicone rubber. The liquid silicone rubber may be medical grade or food grade. The catalytic portion of the liquid silicone rubber may be platinum-based.

In some embodiments, the elastic material may be an elastomer having a Shore A hardness of about 0 to about 50 or a Shore 00 hardness of about 30 to about 85. The Shore A hardness may be about 10, about 20, about 30, or about 40. The Shore 00 hardness may be about 40, about 50, about 60, about 70, or about 80.

The elastic material may include additional additives such as, for example, pigments, heat stabilizers, or mold resistant compounds. Heat stabilizers preserve the polymer's appearance and function. Examples of heat stabilizers include but are not limited to organophosphites or phenolic antioxidants.

In some embodiments, an article of clothing, a shoe, or an insole is disclosed that may include a material that has a plurality of chambers. A wall, a bottom surface, and a top surface may define a chamber of the plurality of chambers. The wall may have a top portion and a bottom portion where the top portion may be adjacent to the top surface, and the bottom portion may be adjacent to the bottom surface. The wall may include an elastic material, and an aerogel powder or foam may be disposed within the chamber.

Figure 3:
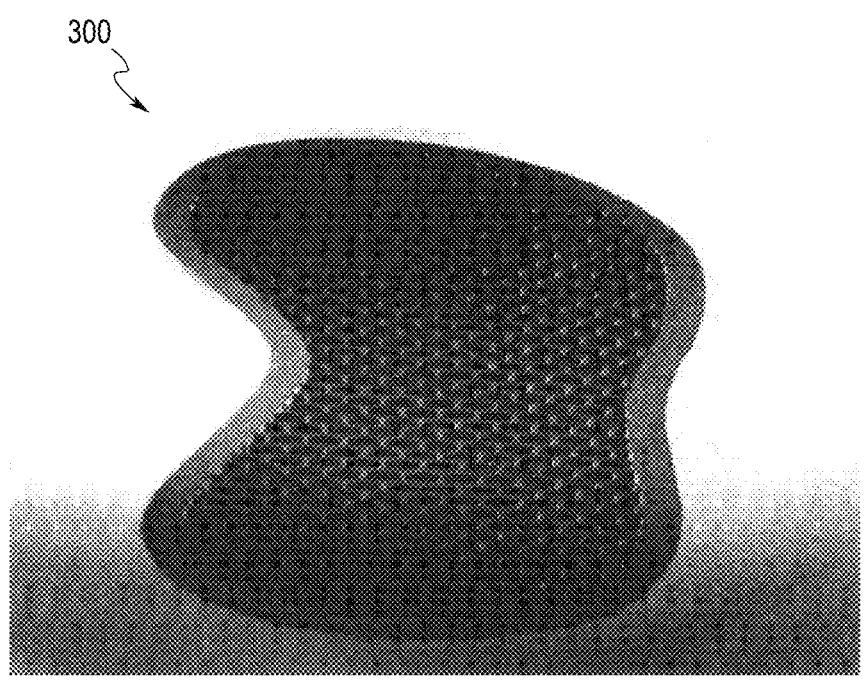
FIG. 3 shows a perspective view of an insole.

FIG. 3 shows a perspective view of an insole 300 having a plurality of compartments forming a honeycomb structure. This view shows the insole 300 without a top surface adhered to the top of the insole 300. As shown in FIG. 3, the insole 300 has a bottom surface and a top surface upon which a foot is placed, wherein the top surface has the general shape of a foot with a concave portion formed in a middle portion of the top surface of the insole 300. One of ordinary skill would readily understand that in the case of an article of clothing that is a shoe, the shoe includes a top surface that is adhered to the top of the insole 300, wherein the top surface and the insole 300 define a volume of space in which a foot is inserted. The insole of FIG. 3 is positioned outside of a shoe.

Figure 4A:
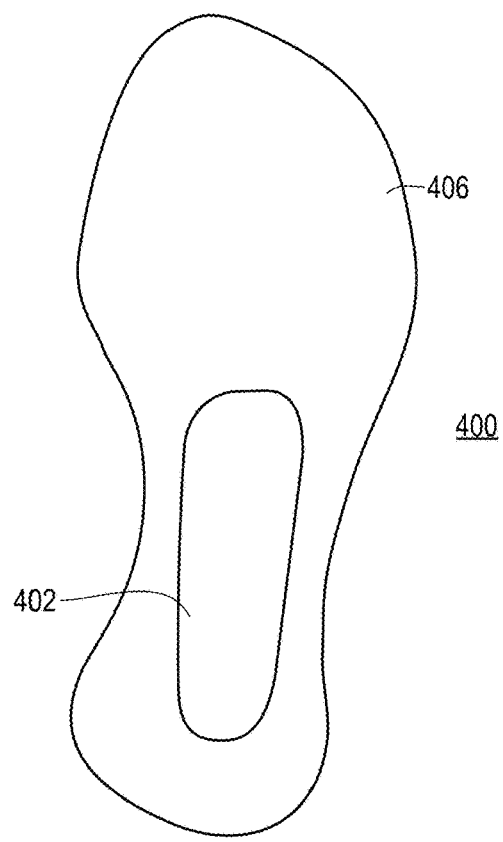
FIG. 4A schematically shows a top view of an embodiment of an insole within an interior of a shoe, and FIG. 4B schematically shows a vertical cross-sectional view of the insole and shoe of FIG. 4A.
Figure 4B:
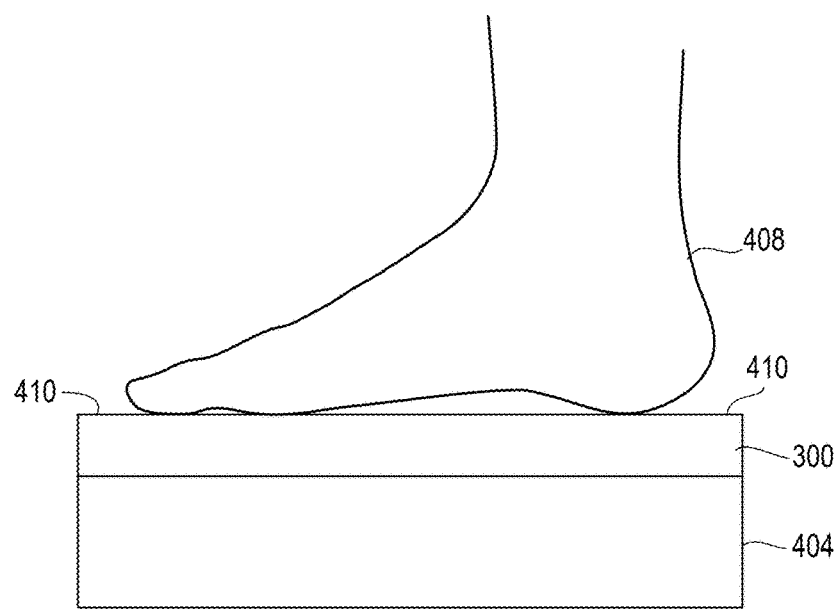

A shoe 400 is schematically shown in FIGS. 4A-4B, wherein the insole 300 of FIG. 3 is placed within an interior 402 of the shoe 400 and is positioned above an outsole 404 of the shoe 400. An upper material 406 is attached to the outsole 404 in a known manner and defines the interior 402. As shown in FIGS. 4A-4B, the shoe 400 is designed so that a foot 408 or a socked foot of an individual is placed within the interior 402 so as to be positioned on a top portion 410 of the insole 300. Note that the shoe 400 shown in FIGS. 4A-B is schematic and is being presented for demonstrative purposes only and in no way is meant to denote a particular shape or size of the shoe 400 and its varous elements.

The insole 300 can be replaced by an insole that is made of the material described previously with respect to FIGS. 1A-1E and FIG. 2. As described previously, such material 200 includes a plurality of chambers 100, wherein a chamber 105, 201 of the chambers 100 is defined by walls 106, 204. a bottom surface 203, and a top surface 202. The wall 204 may have a top portion 206 and a bottom portion 205, wherein the top portion 206 may be adjacent to top surface 202 and the bottom portion 205 may be adjacent to the bottom surface 203. The wall 204 may include an elastic material, such as synthetic rubber, natural rubber, neoprene rubber, thermoplastic elastomer, and foam, and an aerogel powder or an aerogel foam 207 may be disposed within the chamber 105, 201. The elasomer can have a Shore A hardness of about 0 to about 50 or a Shore 00 hardness of about 30 to about 85. In the case of aerogel powder, the powder can be a silicon aerogel powder and each of the chambers 100 has from about 0.01 ml to about 0.1 ml of aerogel powder. In addition, the aerogel power may not be incorporated into the elastic material. As shown in FIGS. 1A-E and 2, adjacent chambers are isolated from one another at all times so that aerogel powder or aerogel foam in one chamber is unable to enter into a chamber that is adjacent thereto. As shown in FIGS. 1A-1E and 3, various horizontal cross-sections for a the chamber 105, 201 are possible. Note that the top surface 202 may be adhered to the top portion of a chamber 105, 201 and the bottom surface 203 may be integrally attached to the bottom portion 205 of a chamber 105, 201.

As used herein, the term "about" refers to the cited value being within the errors arising from the standard deviation found in their respective testing measurements, and if those errors cannot be determined, then "about" refers to within 10% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

Statements

Statement 1: A material, comprising: a plurality of chambers, wherein a chamber of the plurality of chambers is defined by a wall, a bottom surface, and a top surface, the wall having a top portion and a bottom portion, the top portion being adjacent to the top surface, the bottom portion being adjacent to the bottom surface, the wall comprising an elastic material; and an aerogel powder or an aerogel foam disposed within the chamber.

Statement 2: The material of statement 1, wherein a horizontal cross-section of the chamber comprises a shape having at least three sides.

Statement 3: The material of statement 2, wherein the shape has six sides forming a hexagon.

Statement 4: The material of any one of statements 1-3, wherein the bottom surface is integrally attached to the bottom portion of the wall.

Statement 5: The material of any one of statements 1-4, wherein the top surface is adhered to the top portion of the wall.

Statement 6: The material of any one of statements 1-5, wherein the aerogel powder is a silicon aerogel powder.

Statement 7: The material of any one of statements 1-6, wherein each chamber has an amount of aerogel powder ranging from about 0.01 ml to about 0.1 ml.

Statement 8: The material of any one of statements 1-7, wherein the elastic material is selected from synthetic rubber, natural rubber, neoprene rubber, thermoplastic elastomer, and foam.

Statement 9: The material of any one of statements 1-8, wherein the elastic material is an elastomer having a Shore A hardness of about 0 to about 50 or a Shore 00 hardness of about 30 to about 85.

Statement 10: The material of any one of statements 1-10, wherein the aerogel powder is not incorporated into the elastic material.

Statement 11: An article of clothing comprising the material of any one of statements 1-10.

Statement 12: A shoe comprising the material of any one of statements 1-11.

Statement 13: An insole comprising the material of any one of statements 1-12.

Statement 14: A process of making a material, comprising: adding an elastic material precursor into a mold; curing the elastic material precursor to form a plurality of chambers comprising an elastic material, a chamber of the plurality of chambers being defined by a wall, the wall having a top portion and a bottom portion; adding an aerogel powder or an aerogel foam into the chamber; attaching a bottom surface to the bottom portion of the wall by either integrally forming the bottom surface and the wall or attaching the bottom surface after the wall is formed; and attaching a top surface to the top portion of the wall.

Statement 15: The process of statement 14, wherein the aerogel powder is a silicon aerogel powder.

Statement 16: The process of any one of statements 14-15, wherein each chamber has an amount of aerogel powder ranging from about 0.01 ml to about 0.1 ml.

Statement 17: The process of any one of statements 14-16, wherein the elastic material is selected from synthetic rubber, natural rubber, neoprene rubber, thermoplastic elastomer, and foam.

Statement 18: The process of any one of statements 14-17, wherein the elastic material is an elastomer having a Shore A hardness of about 0 to about 50 or a Shore 00 hardness of about 30 to about 85.

Statement 19: The process of any one of statements 14-18, wherein a cross-section of the chamber comprises a shape having at least three sides.

Statement 20: The process of statement 19, wherein the shape has six sides forming a hexagon.

What is claimed is:

1. A shoe comprising:
   an upper material that defines an interior;
   an outsole to which the upper material is attached:
   an insole positioned within the interior and above the outsole,
   wherein the insole comprises a material, wherein the material comprises:
      a top surface;
      a bottom surface;
      a first chamber;
      a second chamber adjacent to the first chamber, wherein the second chamber comprises:
         a wall comprising an elastic material;
         a bottom surface; and
         a top surface, wherein the wall comprises a top portion and a bottom portion, the top portion being adjacent to the top surface, and the bottom portion being adjacent to the bottom surface; and
      an aerogel foam is disposed within the second chamber, wherein the second chamber is isolated from the first chamber at all times such that the aerogel foam disposed within the second chamber is unable to enter the first chamber.

2. The shoe of claim 1, wherein a horizontal cross-section of the second chamber comprises a shape having at least three sides.

3. The shoe of claim 2, wherein the shape has six sides forming a hexagon.

4. The shoe of claim 1, wherein the bottom surface is integrally attached to the bottom portion of the wall.

5. The shoe of claim 1, wherein the top surface is adhered to the top portion of the wall.

6. The shoe of claim 1, wherein the elastic material is selected from the group consisting of synthetic rubber, natural rubber, neoprene rubber, thermoplastic elastomer, and foam.

7. The shoe of claim 1, wherein the elastic material is an elastomer having a Shore A hardness of about 0 to about 50 or a Shore 00 hardness of about 30 to about 85.

8. An insole comprising:
   a bottom surface;
   a top surface having a general shape of a foot with a concave portion formed in a middle portion of the top surface;
   a first chamber;
   a second chamber adjacent to the first chamber, wherein the second chamber comprises:
      a wall comprising an elastic material;
      a bottom surface; and
      a top surface, wherein the wall comprises a top portion and a bottom portion, the top portion being adjacent to the top surface, and the bottom portion being adjacent to the bottom surface; and
   an aerogel foam is disposed within the second chamber, wherein the second chamber is isolated from the first chamber at all times such that the aerogel foam disposed within the second chamber is unable to enter the first chamber.

9. The insole of claim 8, wherein a horizontal cross-section of the second chamber comprises a shape having at least three sides.

10. The insole of claim 9, wherein the shape has six sides forming a hexagon.

11. The insole of claim 8, wherein the bottom surface is integrally attached to the bottom portion of the wall.

12. The insole of claim 8, wherein the top surface is adhered to the top portion of the wall.

13. The insole of claim 8, wherein the elastic material is selected from the group consisting of synthetic rubber, natural rubber, neoprene rubber, thermoplastic elastomer, and foam.

14. The insole of claim 8, wherein the elastic material is an elastomer having a Shore A hardness of about 0 to about 50 or a Shore 00 hardness of about 30 to about 85.

* * * * *